July 15, 1924.
W. P. ENGLISH ET AL
HYDRAULIC BRAKE
Filed July 11, 1923
1,501,444
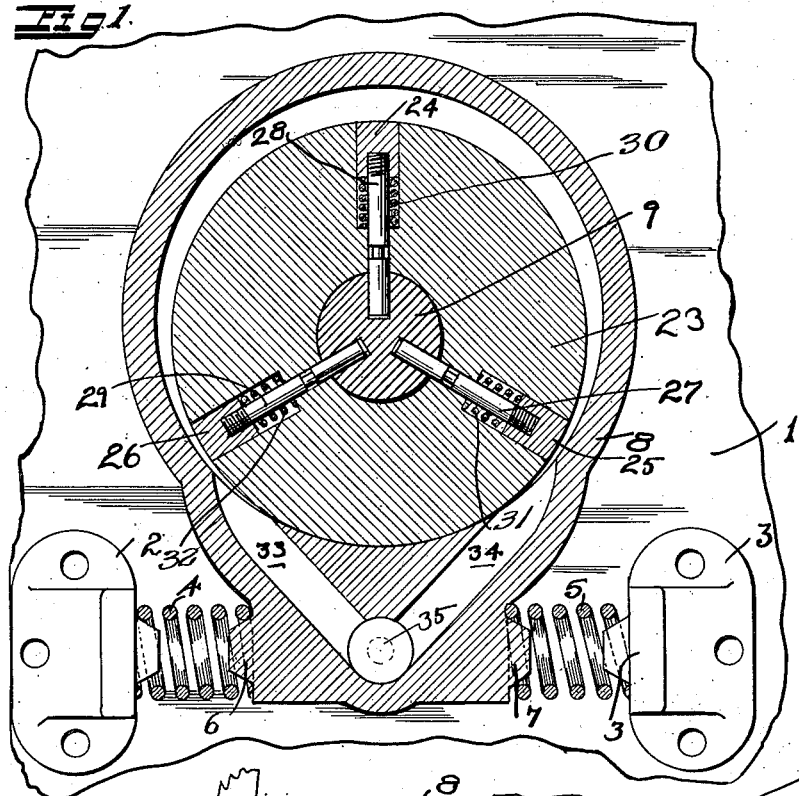
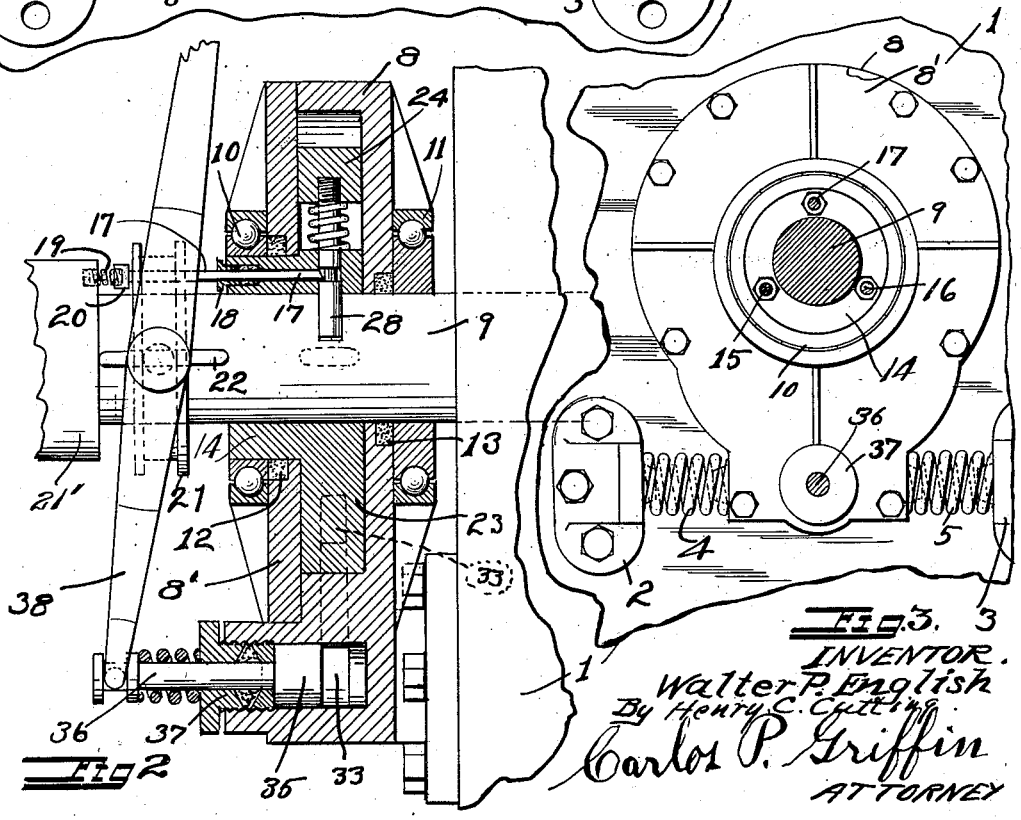
INVENTOR.
Walter P. English
By Henry C. Cutting
Carlos P. Griffin
ATTORNEY Patented July 15, 1924.

1,501,444

UNITED STATES PATENT OFFICE.

WALTER P. ENGLISH AND HENRY C. CUTTING, OF SAN FRANCISCO, CALIFORNIA.

HYDRAULIC BRAKE.

Application filed July 11, 1923. Serial No. 650,772.

*To all whom it may concern:*

Be it known that we, WALTER P. ENGLISH and HENRY C. CUTTING, citizens of the United States, residing at San Francisco, in the county of San Francisco, State of California, have invented a new and useful Hydraulic Brake, of which the following is a specification, in such full and clear terms as will enable those skilled in the art to construct and use the same.

This invention relates to a hydraulic brake, and its object is to provide means whereby a simple form of brake can be produced which will be applicable either to the ground wheels of the vehicle, or it may be applied to the propeller shaft of the vehicle and attached to the ordinary gear box.

An object of the invention is to produce an apparatus which will be quiet and convenient in operation, and which will give the minimum of resistance when the brake is not being applied.

Another object of the invention is to provide means whereby the braking shock will be applied to the vehicle through a set of springs thereby preventing the injury to the vehicle or to the brake itself.

Another object of the invention is to provide means whereby the plungers used to pump the oil will be automatically withdrawn from their pumping position whenever the brake is not applied thereby eliminating all brake friction except when it is desired to stop or hold the vehicle.

Another object of the invention is to produce a brake which will use the power of the moving apparatus to stop it, the operator merely starting the pump and closing a valve, more or less, to give the desired braking effect, said action being accomplished with the expenditure of practically no energy as compared with the effect produced.

Other objects of the invention will appear as the description proceeds.

An embodiment of the invention is shown in the accompanying drawings in which the same reference numeral is applied to the same portion throughout, but we are aware that there may be modifications thereof.

Fig. 1 is a transverse sectional view of the brake,

Fig. 2 is a vertical sectional view of the brake,

Fig. 3 is a view in elevation of the outside of the brake casing.

The numeral 1 represents the gear box in the present instance, although the brake may be applied to any revoluble shaft, wherever it may be convenient to apply the stops 2 and 3.

Operating upon the stops 2 and 3 are two heavy spiral springs 4 and 5. These springs, in turn, bear upon two lugs 6 and 7 on the brake casing 8. The brake casing 8 is movable upon the shaft 9 through the medium of two ball bearings 10 and 11.

Two felt packing rings 12 and 13 are provided to prevent the escape of the oil used in the brake when the car is in use.

Mounted on the shaft 9, under one of the ball bearings is the hub 14 of the disk 23, said disk and its hub being rigidly keyed to the shaft 9.

Three latching stems 15 to 17 pass through the hub and to prevent the escape of the fluid used in the casing 8, there is a packing gland for each stem as shown at 18. Each stem is slidable through a channelled collar 21 in its turn slidable on a feather 22 on the shaft 9, and each stem has a cup-shaped head 20 on which a spring 19 bears, the opposite end of said spring bearing on a fixed collar 21', carried by the shaft.

The disk 23 has a plurality of recesses for the pump plungers 24, 25 and 26 and the plungers have stems 27, 28 and 29 which are notched to receive the latches 15 to 17, whereby the plungers may be held back in the disk to eliminate friction when the brake is not to be applied to retard the apparatus.

Spiral springs 30, 31 and 32 are installed under the plungers 24 to 26, the normal effect of which is to cause the plungers to be extended. The pump plungers rotate within the casing 8. The front of said casing 8' is detachable.

The casing has a chamber therein in which the disk 23 revolves which is eccentric to the disk, and at the bottom this eccentric chamber is connected at two portions by two passage-ways 33 and 34, said passage-ways being formed in the casing 8, and, where they join there is a slidable valve 35 which can close or open the passage-ways at will. This valve has an operating stem 36 which slides through the packing gland 37. The end of the operating stem is pivotally connected to a lever 38 and said lever passes on both sides of the channeled collar 21 and has lugs in engagement therewith. An operating handle or link may be connected to the upper end of the lever 38.

The operation of the apparatus is as follows:

Assuming a car to be in motion and a desire upon the part of the driver to apply the brakes, any movement of the upper end of the lever 38 to the left, (Figure 2) will pull out the latches 15 to 17 until the collar 21 strikes the fixed collar 21' on the shaft 9, thereupon the valve 35 will be closed, much or little, as the driver may wish and the brake applied.

Owing to the fact that the springs push the plungers 24 to 26 out whenever they are released, they will tend to pump the fluid used in the casing from one side thereof to the other through the two passageways 33 and 34, and any obstruction of those passageways will necessarily tend to stop the pump, and, in the same way, to stop the car. Whenever the latches are allowed to be pushed in by the spring, they will forthwith stop the plungers in the retracted position, because, once during each revolution, the periphery of the eccentric chamber, within which the plungers move, pushes the plungers to a position such as will enable the latch to hold them if the latches are in their normal position.

What we claim is as follows, but modifications may be made in carrying out the invention shown in the drawings and in the above particularly described form thereof, within the purview of the invention.

1. In a brake for vehicles, the combination with a casing having a passageway connecting two portions of its periphery, a rotary element within the casing secured to an operating shaft, radially movable plungers carried by said element, means to hold them retracted, a spring for extending them the chamber within which said element rotates being eccentric, whereby fluid placed therein will be transmitted from one portion of said chamber to another portion thereof through the passageways aforesaid, and means to regulate the flow of said material whereby the shaft may be retarded.

2. In a vehicle brake, a casing, means to resiliently hold the casing in a given position, a shaft extending through said casing, a disk rigidly connected to said shaft in a chamber within the casing eccentric to the shaft said casing having passageways connecting different portions of the chamber with each other, radially movable plungers carried by the disk within the casing, means to hold the plungers retracted, and a spring for each plunger to extend the plungers when released whereby fluid placed within the casing is transmitted from one portion thereof through said passageways to another portion thereof, and a valve to regulate the flow of said fluid whereby the shaft may be retarded.

3. In a vehicle brake, a casing, means to hold said casing in substantially a fixed position, a shaft extending through the casing, a disk keyed to said shaft within the casing and in engagement with one side of an eccentric chamber in said casing, said casing also having passageways connecting different portions of its periphery together, radially movable plungers carried by the disk, means to hold them retracted, springs to extend the plungers when released, and a valve for determining the flow of fluid through said passageways whereby the shaft may be retarded.

4. In a vehicle brake, comprising a casing, springs for holding said casing resiliently in a given position, a shaft extending through the casing, a disk thereon, radially movable plungers carried by said disk, means to hold the plungers retracted, springs for extending the plungers when released so they will travel in contact with the periphery of an eccentric chamber within the casing the casing also having passageways connecting different portions of the periphery of said chamber and through which the plungers force a fluid placed therein, a valve for closing said passageways, a spring for holding said valve normally open, and a lever arranged to release the plunger holding mechanism and to close the valve when the shaft is to be rotated.

5. In a vehicle brake, the combination with a casing, springs for resiliently holding said casing in a given position, a fixed abutment against which each spring bears, a shaft extending through the casing, a disk thereon within a chamber in the casing eccentric to the shaft said casing also having passageways connecting different portions of the periphery of the chamber with each other, a valve for regulating the movement of a fluid through said passageways, radial plungers carried by the disk, means to hold the plungers retracted, and means to force the plungers into contact with the periphery of the chamber when they are released, said plungers being automatically held retracted whenever the operating mechanism is released.

6. In a fluid power brake, a casing, a pump therein, plungers carried thereby, means to hold the plungers inactive, means to extend the plungers at will, and means to obstruct the flow of the fluid whereby the pump will retard the apparatus to which it is connected.

7. In a fluid power brake, a casing, a pump therein, pump plungers carried thereby, automatic means to stop and hold the pump plungers inactive when the brake is not to be applied, means to extend the pump plungers at will, and means to obstruct the flow of the fluid used whereby the pump will retard the apparatus to which it is connected.

8. In a fluid power brake, a casing, a pump therein, pump plungers carried thereby, automatic means to stop and hold the plungers inactive when the brake is not to be applied, and an operating lever having means connected thereto whereby, with a single movement thereof it will release the pump plungers and obstruct the flow of fluid to retard the apparatus to which the pump is connected.

9. In a power brake, a casing, a rotary pump therein, radially movable plungers carried thereby, means to hold the plungers inactive, means to extend the plungers at will, and means to obstruct the flow of fluid whereby the pump will retard the apparatus to which it is connected.

10. In a fluid power brake, a casing, a rotary pump therein, radially movable plungers carried thereby, automatic means to stop and hold the plungers inactive when the brake is not to be applied, means to extend the plungers at will, and means to obstruct the flow of fluid whereby the pump will retard the apparatus to which it is connected.

In testimony whereof we have hereunto set our hands this 2nd day of July A. D. 1923.

HENRY C. CUTTING.
WALTER P. ENGLISH.